Figure 4:
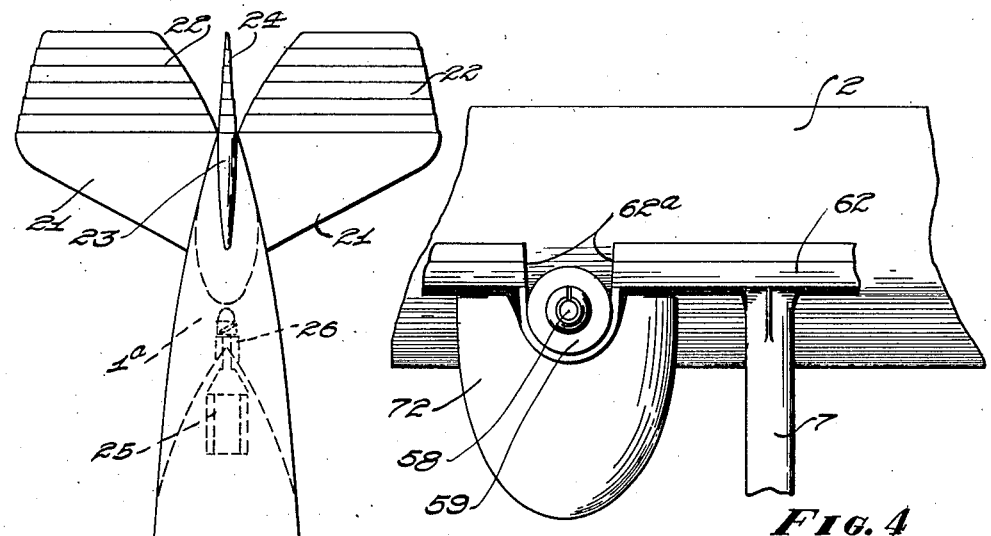

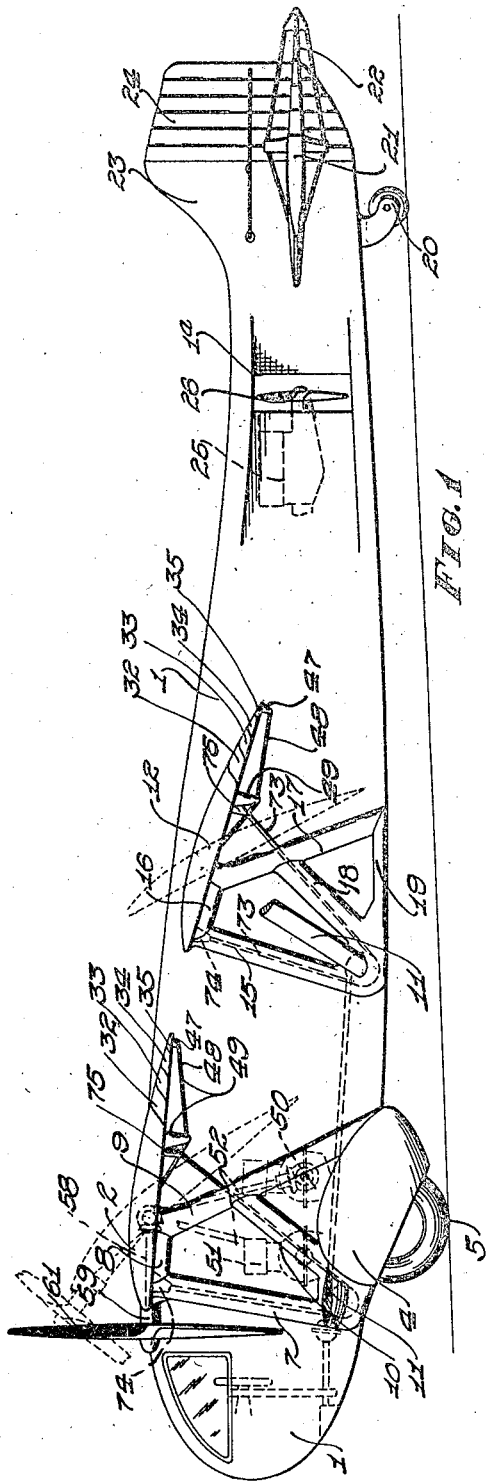

Feb. 16, 1932.  J. S. MAXWELL  1,845,307
AIRCRAFT
Filed Aug. 12, 1929  5 Sheets-Sheet 2

INVENTOR.
JOHN S. MAXWELL
BY
A. B. Bowman
ATTORNEY.

INVENTOR.
JOHN S. MAXWELL
BY A.B. Bowman
ATTORNEY

Feb. 16, 1932. J. S. MAXWELL 1,845,307
AIRCRAFT
Filed Aug. 12, 1929 5 Sheets-Sheet 4

INVENTOR.
JOHN S. MAXWELL
BY
A. B. Bowman
ATTORNEY

Feb. 16, 1932.  J. S. MAXWELL  1,845,307
AIRCRAFT
Filed Aug. 12, 1929   5 Sheets-Sheet 5

INVENTOR.
JOHN S. MAXWELL
BY
A.B. Bowman
ATTORNEY

Patented Feb. 16, 1932

1,845,307

UNITED STATES PATENT OFFICE

JOHN S. MAXWELL, OF OCEAN BEACH, CALIFORNIA

AIRCRAFT

Application filed August 12, 1929. Serial No. 385,209.

My invention relates to aircraft, more particularly to airplanes, and the objects of my invention are: First, to provide an airplane in which both the angle of incidence of the wings and their camber may be varied thereby varying the angle of attack; Second, to provide an airplane of this class in which the minimum flight speed may be varied so that said airplane may take off and land at a slow speed yet may fly, when on its course, at a high speed; Third, to provide an airplane of this class in which the center of lift remains substantially constant although the lift coefficients of its sustaining surfaces vary; Fourth, to provide an airplane of this class in which an unturbulated flow of air over the control surfaces may be created artificially by means at the rear of the sustaining surfaces so that the effectiveness of said control surfaces are not dependent upon the position of the sustaining surfaces or the speed of the airplane, thereby greatly increasing the maneuverability of the airplane especially when landing or taking off; Fifth, to provide an airplane, the lifting ability of which may be varied according to the load carried; Sixth, to provide an airplane of this class in which the direction of thrust from the propelling means shifts with the change in the angle of incidence of the sustaining surfaces; Seventh, to provide an airplane having propellers arranged along the leading edge of the wing in which the angle of attack of the wing relative to the wash from the propellers may be varied until the angle of maximum lift is reached, whereupon the propeller thrust maintains a constant relation to the wing chord; Eighth, to provide an airplane of this class in which the camber of the sustaining surfaces may be varied so as to increase the lifting force and the control ability of said airplane, and Ninth, to provide on the whole, an improved airplane which is sturdy of construction, durable, efficient of action, and which will not readily deteriorate or get out of order.

Figure 3:
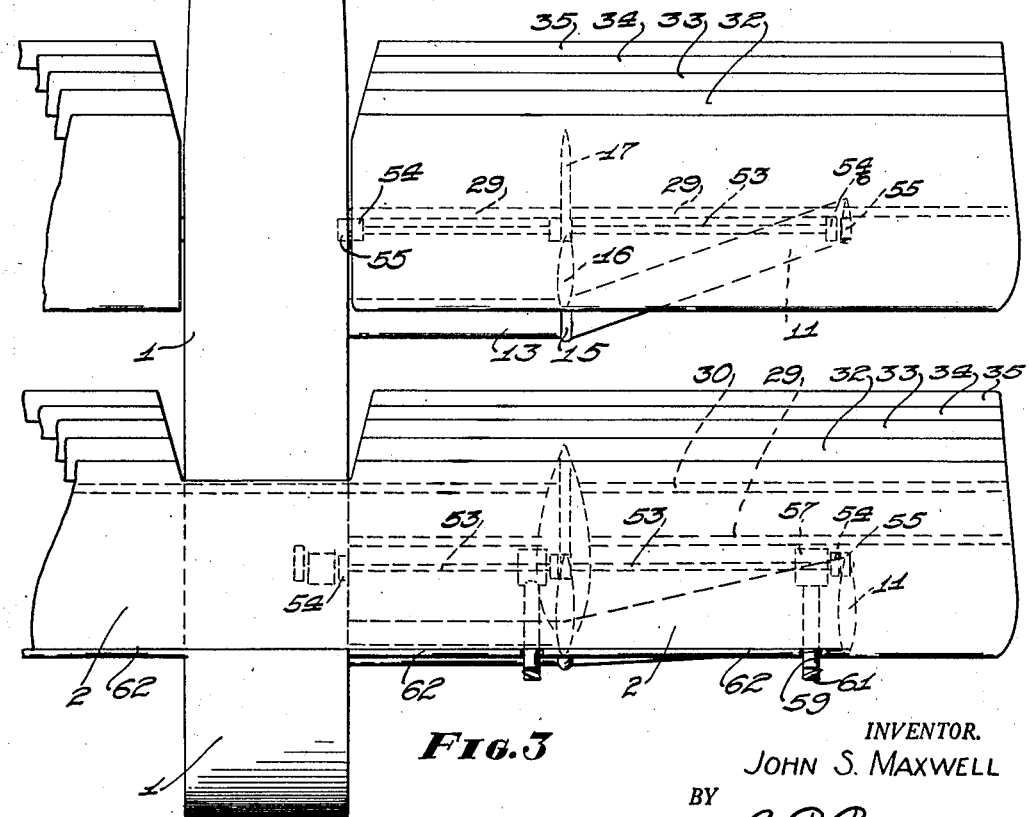
Figure 5:
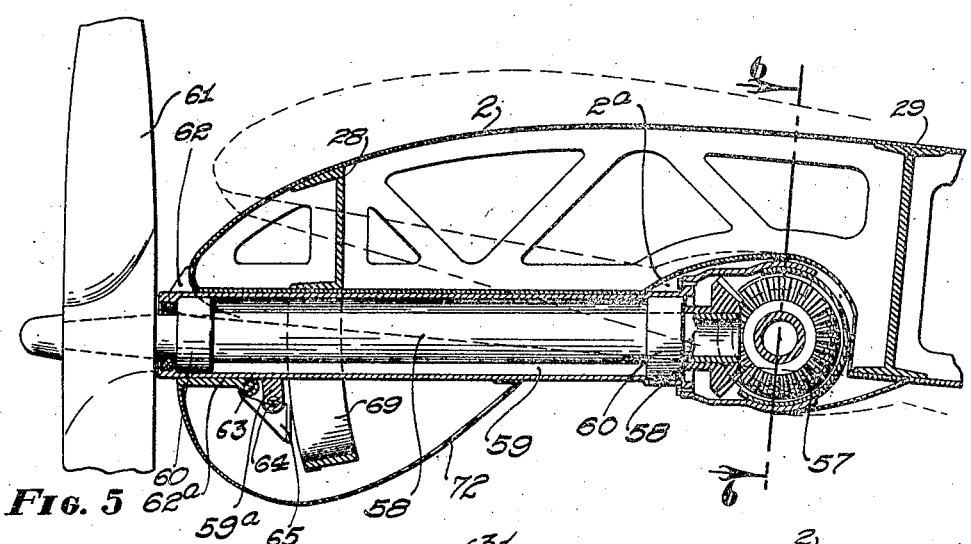
Figure 6:
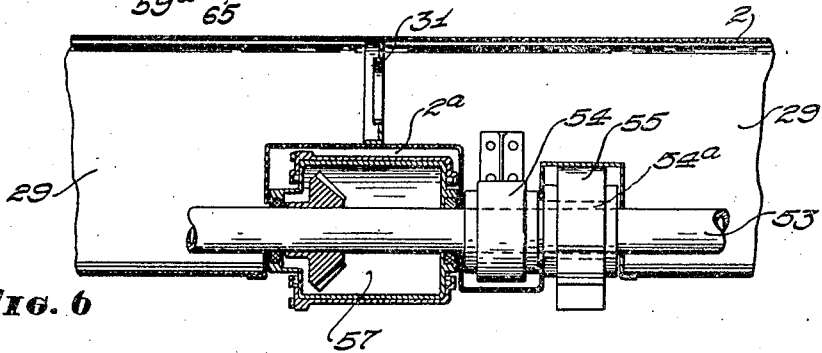
Figure 7:
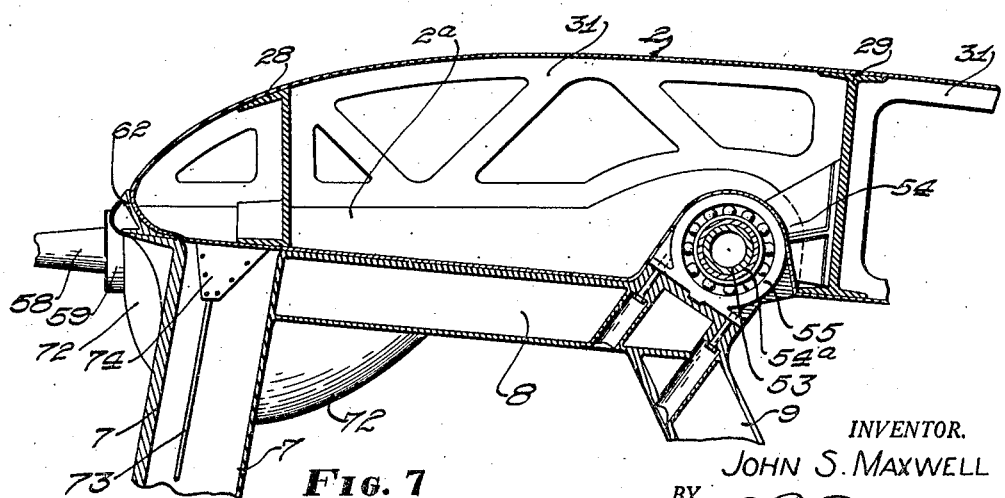
Figure 9:
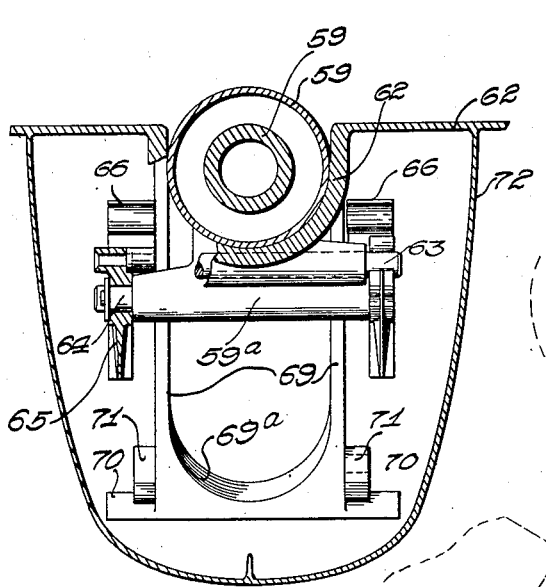
Figure 10:
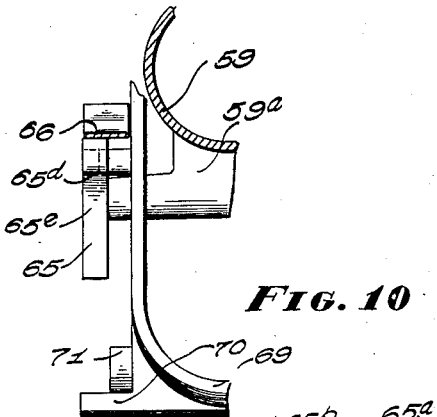
Figure 11:
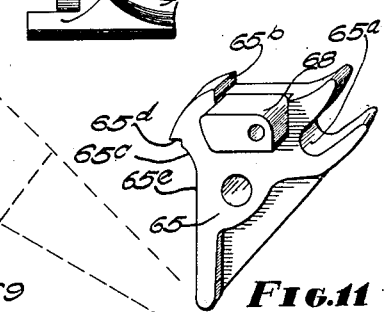
Figure 8:
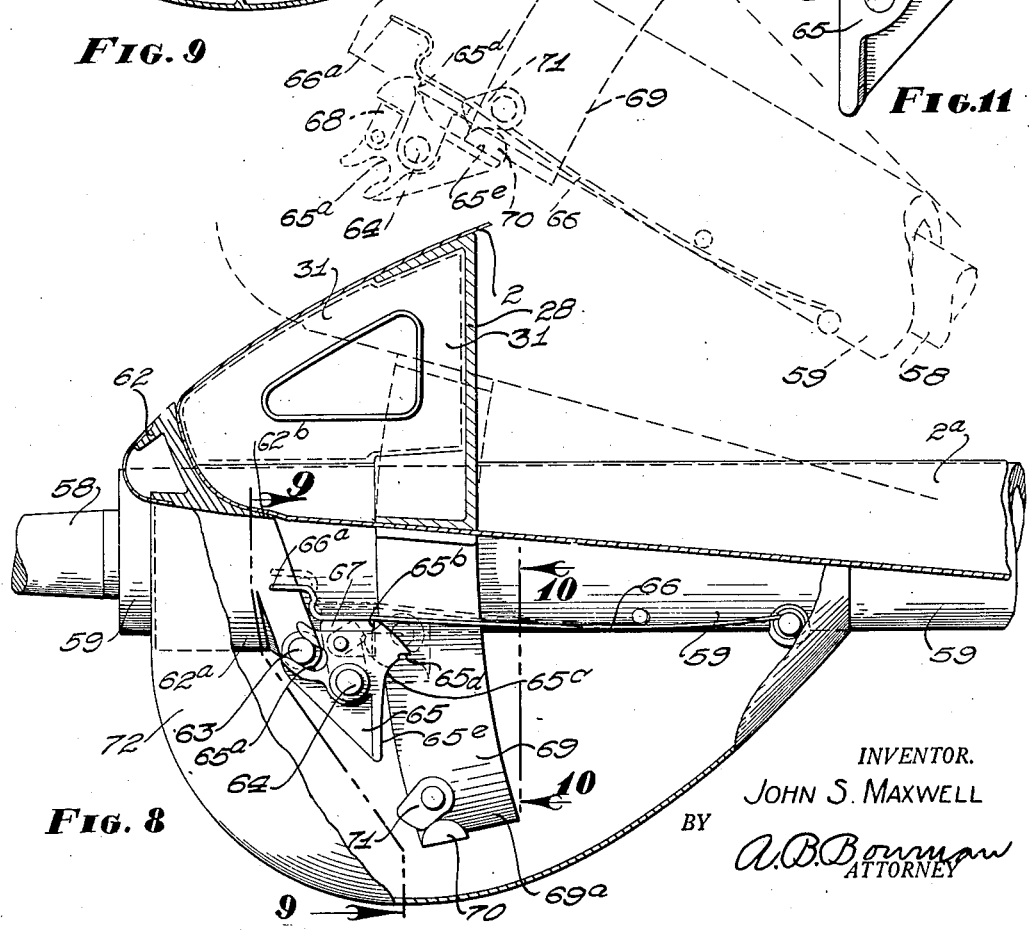
Figure 12:
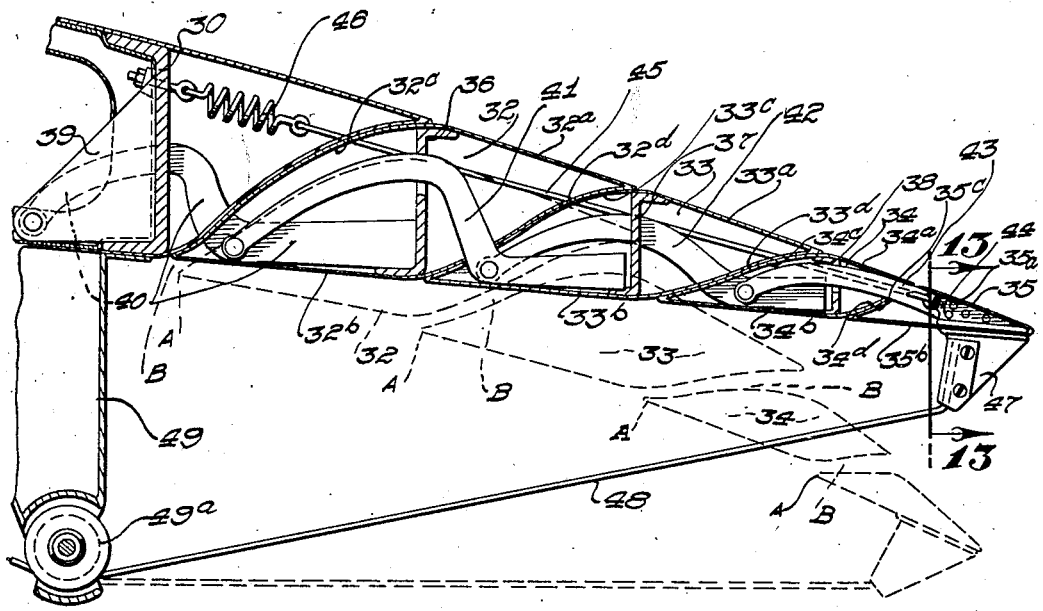
Figure 13:
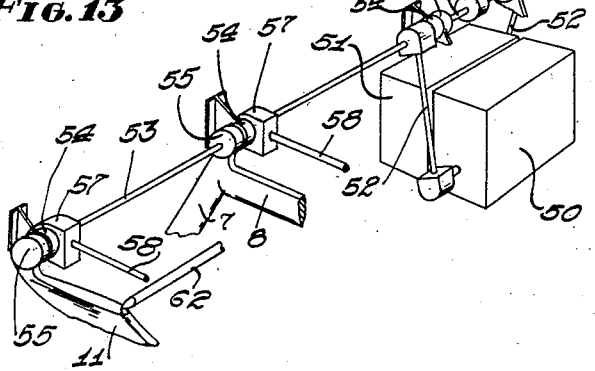
Figure 14:
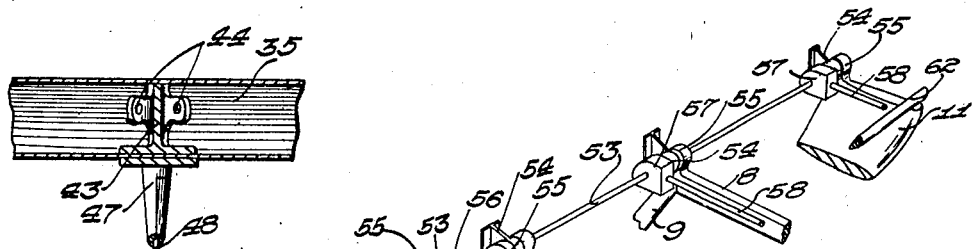

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my airplane with parts and portions broken away facilitating the illustration; Figure 2 is a fragmentary front view thereof; Figure 3 is a fragmentary plan view thereof; Figure 4 is an enlarged fragmentary elevational view of the leading edge of the front wing; Figure 5 is an enlarged fragmentary sectional view through 5—5 of Figure 2 with parts and portions as shown in elevations to facilitate the illustrations; Figure 6 is a fragmentary sectional view through 6—6 of Figure 5 with parts and portions as shown in elevation to facilitate the illustration; Figure 7 is a sectional view through 7—7 of Figure 2 with parts and portions shown in elevations to facilitate illustration; Figure 8 is a still further enlarged sectional view similar to Figure 5 showing particularly the lock and catch means for holding the propeller shaft relative to the wings; Figure 9 is a fragmentary sectional view through 9—9 of Figure 8; Figure 10 is another fragmentary section view through 10—10 of Figure 8; Figure 11 is a perspective view of one of the catch members and the dog therefor; Figure 12 is a typical fragmentary transverse sectional view of a trailing portion of the wing; Figure 13 is a fragmentary sectional view thereof through 13—13 of Figure 12; and Figure 14 is a diagrammatical view of the driving mechanism for the propeller shown in perspective.

Similar characters of reference refer to similar parts and portions throughout the several views of the drawings.

Fuselage 1, forward wing 2, forward spacing members 3, wheel cowling 4, forward wheels 5, forward strut members 7, 8, 9, 10 and 11, rear wings 12, rear spacing members 13, rear strut set members 15, 16, 17, 18 and 19, tail wheel 20, stabilizers 21, elevators 22, fin 23, rudder 24, engine 25, propeller 26, wing spar members 28, 29 and 30, wing ribs 31, wing sections 32, 33 and 34, trailing edge member 35, wing section spar members 36, 37 and 38, bracket members 39, lever members 40, 41, 42 and 43, anchor member 44, cables 45, springs 46, control cable anchors 47, control cables 48, horn members 49, power units 50 and 51, connecting shafts 52, main shafts 53, spar-shaft bearings 54, wing bearings 55, clutch means 56, gear casings 57, propeller shafts 58, propeller shaft housings 59, propeller shaft bearings 60, propeller 61, propeller housing support members 62, pin member 63, catch supporting rod 64, catch members 65, catch springs 66, lock members 67, spring releasing dog members 68, stirrups 69, cam means 70, dogs 71, cowling 72, wing tilting cables 73, anchors 74 and 75, and operating shafts 76, constitute the principal parts and portions of my airplane.

A fuselage 1 is provided which is made as streamlined as feasible. A single wing 2 extends transversely across the upper side of the fuselage 1, near the fore end thereof. This wing is rotatably mounted relative to the fuselage in a manner to be described hereinafter.

Extending outwardly from the opposite sides of the fuselage underneath and slightly forward of the wing 2 are horizontal forward spacing members 3, the extended end of each spacing member 3 joining the forward side of a wheel cowling 4. Each of the cowling means 4 streamlines one of the forward wheels 5, as shown in Figs. 1 and 2. These wheels may be supported in any conventional manner by means not shown.

Extending upwardly at the forward edge of the cowling 4, toward the leading edge of the wing 2, is a strut member 7. The upper end of the strut member 7, terminates adjacent to the under side of the wing 2, and is secured to a relatively short, rearwardly extending strut 8, which extends approximately horizontally adjacent to the under side of the wing 2, as shown in Figs. 1 and 7. The strut 8 terminates about a third of the way of the wing chord from the leading edge thereof, and joins downwardly and rearwardly extending strut 9, the lower end of which is connected to the rear end of the corresponding wheel cowling 4. The said wheel cowling 4, also forms one of the struts of the strut set comprising the members 7, 8 and 9. A diagonal strut member 10 extends between the juncture of each strut 7 with its wheel cowling 4, and the central portion of the rear strut member 9. The strut members 7 and 10 and also the spacing members 3 are hollow so as to form conduits for control means adapted to tilt the wing 2.

A diagonal strut 11 is secured at its one end to the outer forward side of each wheel cowling 4. This strut extends away from the plane of symmetry and upwardly toward the under side of the wing 2 midway between the strut 8 and the extended end of the wing. The upper or extended end of each strut 11 is made approximately as wide as the strut 8 is long. At this extended end the leading edge of the strut 11 is almost flush with the leading edge of the wing, while the trailing edge of said strut is about one-third the wing chord rearwardly. Located a slight distance rearwardly of the forward wing 2, are rear wings 12 extending outwardly from each side of the fuselage. Each wing 12 is arranged to rotate about an axis transversely with the fuselage. The rear wings 12 are given a greater angle of incidence than the forward wing 2 so as to have the proper angle of attack relative to the wash from the forward wing 2.

Extending outwardly from the fuselage 1, below and just forward of each rear wing member 12, is a spacing member 13, at the extended end of which is arranged a strut set, having strut members 15, 16, 17, 18 and 19 corresponding consecutively to the strut members 7, 8, 9, 10, and the cowling 4.

A suitable tail wheel 20, is provided at the rear end of the fuselage 1.

At the tail end of the fuselage are arranged stabilizers 21, and their elevators 22, as well as a fin 23, and a rudder 24, forming the control surfaces. Just forwardly of said control surfaces, the fuselage 1, is provided with a transversely extending opening 1a, therethrough, the forward margin of which is given a shape similar to the rear portion of an airfoil, while the rear margin of said opening 1a is given a curvature similar to the leading portion of an airfoil, as shown in Fig. 3. An engine 25 is mounted just forward of the opening 1a and is provided with a propeller shaft which extends into said opening. A propeller is mounted upon said shaft so as to rotate in the opening 1a. The wash from the propeller 26, is directed backwardly out from the opening 1a over the stabilizers 21 and elevators 22 so that although the airplane may be standing still a flow of air is maintained over the control surfaces and the tail end of the airplane may be readily shifted by operating the controls in the usual manner.

The wing 2 and the wing members 12 are each provided with a forward spar member 28, a main or central spar member 29, and rear spar members 30. These spar members are held in spaced relation to each other by wing ribs 31.

The wings 2 and 12 are practically identical in construction except the wing 2 extends across the fuselage and is provided with propeller driving mechanism and means for mounting propellers along its leading edge. The wings 2 and 12 are not complete airfoil sections but terminate just rearwardly of the rear spar member 30. From the rear spar member 30 to the trailing edge of the wings 2 and 12, there is provided a plurality of wing section members which nestle one adjacent to the other so that their exposed upper and lower surfaces form a continuation and completion of the wing airfoil section. These various wing sections are shiftable so as to form slots therebetween for conducting air passing along the lower surfaces of the airfoil sections to the upper sides of said airfoil sections. This structure is shown in detail in Fig. 12.

The wing section member 32, which is adjacent to the rear end of the main body portion of the wing, is roughly rhomboidal in cross section having two substantially straight sides 32a and 32b which form the exposed upper and lower surfaces thereof and are continuations of the wing surfaces. The lower side 32b is in position forwardly of the upper side 32a so that the forward side 32c of the wing section 32 also faces upwardly. The forward side of the wing section 32 is made convex so as to fit underneath a corresponding concave rear side of the wing 2 or 12. The rear side 32d of the wing section 32 is made roughly S-shaped.

The second wing section 33 is also roughly rhomboidal in cross section and is provided with upper and lower exposed surfaces 33a and 33b, respectively, which form a continuation of the exposed surface of the first wing section 32. The forward side 33c of the wing section 33 conforms to the rear side 32d of the first wing section 32. The rear side 33d of the wing section 33 is also made roughly S-shaped. A third section 34 is made approximately rhomboidal in cross section and is provided with upper and lower exposed sides 34a and 34b respectively, which form a continuation of the wing sections 32 and 33. The forward side 34c thereof corresponds to the rear side 33d of the wing section 33. The rear side 34d is also made substantially roughly S-shaped. A trailing edge member 35 of roughly triangular cross section fits against the rear side of the wing section 34 with its upper and lower sides 35a and 35b forming a continuation of the airfoil section and joining each other at the trailing edge of the wing. The forward side 35c corresponds in shape to the rear side 34d of the wing section member 34.

The wing sections 32, 33 and 34 are provided with wing section spars 36, 37 and 38, respectively, which are positioned at the points of greatest thickness of their respective wing section. Suitable ribs may be provided in the several wing sections.

Secured to the rear spar members 30 of the main wing portion in spaced relation are a plurality of bracket members 39. These brackets extend forwardly of the spar member 30 and as near to the lower side of the wing as possible. Rotatably mounted at the lowest possible position on each bracket 39 is an extended end of a lever 40 which extends upwardly and rearwardly through a slot provided in the rear spar member 30, through the rear wall of the main wing portion 2 or 12, and into the first wing section member 32, where it is rigidly secured to the spar member 36 thereof. After entering the section member 32 the lever 40 extends adjacent to the lower side 32d of the wing section member. Rotatably secured to the lever 40 just within the forward side of the wing section member 32 is a second lever member 41, which also extends rearwardly in a manner similar to the lever member 40, through the spar member 36, through slots provided in the adjacent walls of the section members 32 and 33, and joins to the spar member 37. Similarly connected to the lever 41 is a third lever 42 which extends rearwardly through the spar member 37 of the wing section 33, through the adjacent walls of the wing sections 33 and 34 and is secured to the spar member 38 of the wing section 34. A fourth lever 43 is rotatably secured by a forward end to the lever 42 just within the wing section 34. The last member 43 extends rearwardly and is secured to the trailing edge member 35. The rotational movements of the various levers are limited by the slots in the various spar members through which they pass. The levers may be further supported by being secured to the ribs of the several wing sections.

These levers support their respective wing sections and permit a limited rotational movement of the said wing sections relative to the wing members so that said wing sections may shift to the position shown by dotted lines in Fig. 12.

When said members are shifted to the dotted line position, shown in Fig. 12, each member extends slightly below the adjacent forward member, as indicated by A, so as to scoop a certain quantity of air which is passing along the under side of the wing section. Due to the curvature of the forward side of the various wing sections and their trailing edge members, the air is directed upwardly through the slots B, and rearwardly along the upper sides of the respective members with an increased velocity due to the cambered upper surfaces of the various members constituting their forward and upper sides. When shifted so as to form the slots B, each wing section forms an individual airfoil having its own center of pressure which tends to counterbalance a forward shifting of the center of pressure of the main wing, when said wing is rotated about a horizontal axis. At the same time the camber of the complete wing section comprising the main wing 2 or 12 and their wing section members, is increased, thereby increasing the lift of the wing.

The wing section members and the trailing edge member 35 are normally held in the adjacent nestled relation shown by solid lines in Fig. 12, by the difference in air pressure between the upper and lower sides thereof, the pressure on the upper side being less than that on the lower side. They are further held in place by means of anchor members 44 secured to opposite sides of each lever member 43 inside the trailing edge member 35. Secured to the anchor members 44 are cables 45 which extend forwardly through suitable openings provided in the several wing section members until within the main wing portion where each cable portion 45 is secured to a spring 46, said spring being in turn secured to the rear spar member 30. The cable members 45 extend substantially parallel with the upper exposed surfaces of the various wing members so that there is a tendency to pull upward as well as forward until shifted by the following means.

The downward movement of the wing section members and the trailing edge member necessary to form the slots B is accomplished by control cables 48 which are secured at their rear ends to downwardly extending control cable anchors 47 secured to the side of the trailing edge member 35. Each of the cables 48 extends forwardly over a pulley 49a mounted in a horn member 49 which is rigidly secured to the under side of the wing 2 or 12. The cable 48 is connected with controls within reach of the pilot by any suitable link arrangement which produces the desired movement of the wing sections.

In addition to the engine 25, two power engines 50 and 51 are provided, which are mounted within the fuselage 1, in adjacent parallel relation with their crankshafts extending transversely with the fuselage. The shaft of each power unit is joined to a connecting shaft 52 which extends upwardly and in turn drives a main shaft 53. The two main shafts 53 are in alinement with each other and extend in opposite directions from the fuselage, through the extended portions of the main forward wing member 2, just forward of the main spar member 29 and are as near to the lower side of the wing as possible.

The main shafts 53 are supported relative to the main spar 29 by spar-shaft bearings 54 arranged in spaced apart relation, as shown in Fig. 6 and the diagrammatical view, Fig. 14. A sleeve 54a extends from each spar-shaft bearing and journals a wing bearing 55. Some of these bearings are secured at the point of juncture between the spar members 8 and 9, the others of which are secured to the upper edge of the diagonal struts 11.

The adjacent ends of the shaft members 53 are linked together by a suitable clutch mechanism 56 which enables one or both motors to run the main shaft 53, thus should one motor fail, the other motor may be used to drive all the propellers by linking the shafts 53 together through the clutch 56. Also the relative speeds of the two motors may be varied so as to assist the banking and turning of the airplane.

Arranged as near as possible to each wing bearing 55 which is supported by the struts 8 or 11, is a gear casing 57 which is capable of slight rotational movement relative to the wing. Each gear casing 57 contains gears which link a propeller shaft 58 with the main drive shaft 53. Each propeller shaft extends forwardly through a propeller shaft housing 59 and is supported relative thereto by bearings 60. Each gear casing 57 and propeller housing rests in a recess formed in the under side of the wing 2, as shown best in Fig. 5. Each propeller shaft and housing projects a slight distance forwardly of the leading edge of the wing and the propeller shaft is provided with a suitable propeller 61.

The rear end of each propeller shaft housing 59 is supported by a gear casing 57, while the forward end of said propeller shaft housing is supported, when the wing is in the position shown by solid lines in Figs. 5, 9 and 10, by a hanger 62a, forming a part of the propeller housing support members 62.

Two propeller housing support members 62 are provided, one for each extended portion of the wing 2. Each supporting member 62 extends along the lower, leading edge of the wing, forming a continuation of the wing airfoil section, as shown best in Fig. 7. Each support member, which also is a leading edge member of the wing, is secured to the fuselage 1, to the forward upper side of the strut 7, and to the forward upper corner of the diagonal strut 11, as shown in Figs. 2, 3 and 7. The hangers 62a referred to above are merely downward extending loops open at their upper sides and formed wherever the supporting member is crossed by a propeller shaft housing 58. Extending transversely with each hanger portion 62a at the rear lower side thereof, and projecting past the side margins of said hanger 62a, is a pin member 63. Secured to the propeller shaft housing 59, just a slight distance rearwardly and below the pin 63, is a boss portion 59a which receives a catch supporting rod 64. Each rod 64 extends in parallel relation to the corresponding pin 63. Rotatably mounted at the end of the rod 64, is a catch member 65 which has a bifurcated portion 65a adapted to straddle the corresponding end of the pin 63, as shown in Figs. 8 and 9. The upper surface of the catch member 65, rearwardly of the bifurcated portion 65a, is flat except for an upwardly projecting lug 65b adjacent the rear side. The rear side 65e of each catch member 65, extends at right angles to its upper surface, except for a cam engaging portion 65c near the upper end of the rear side, and a lug portion 65d, formed in said cam engaging portion 65c.

As shown best in Figure 11, each catch member is provided with a recess portion on its inner side which intersects the upper surface of said catch member. The recess portion receives a lock releasing dog member 68. The dog member is a small lever and is rotatably mounted so that its upper surface is normally flush with the flat upper surface of the catch member 65. The side margin of the dog member 68 extends past the inner side wall of the catch member 65.

Leaf springs 66 are secured at their one ends to the propeller shaft housing 59, one at each side thereof. Each spring 66 extends forwardly over the corresponding catch member 65. Each spring is provided with a locking member 67 which extends downwardly and normally rests against the upper surface of the corresponding catch member 65. The rear end of each locking member 67 engages a lug 65b so as to lock the catch member in the position shown by solid lines in Figure 8.

The forward spar member 28 is positioned just rearwardly of the catch member 65, within the wing 2. Secured to the forward spar member 29, is a stirrup member 69, which extends downwardly past the side margins of the propeller housing and terminates in a loop portion 69a at its lower end, which is adapted to engage the under side of the housing 59 when the wing 2 is shifted about its pivotal axis. The stirrup 69, is made arcuate in a plane extending longitudinal with the propeller shaft housing so that it just clears the rear side of the dogs 68.

At the lower forward edge of the loop portion 69a, there is provided two outwardly extending cam means 70, one extending from each side and engageable with the cam-engaging portion 65c of the corresponding catch member 65 when the forward edge of the wing 2 is tilted upwardly.

The cams 70 are adapted to rotate their respective catch members about the axis of the rod 64. In order to do this, dog members 71 are rotatably secured to the sides of the stirrup above the cam means 70. The cams limit the downward movement of the dogs so that they project past the forward margin of the stirrup. The dogs 71 are positioned so as to pass between the inner walls of the catch members 65 and the housing 59 and engage the projecting portions of the dogs 68 when the stirrup is shifted upwardly, as shown by the lower set of dotted lines in Figure 8.

Upward movement of the dogs 68 releases the lock member 67 from the lug 65b, allowing the catch to rotate about ninety degrees, whereupon the lug 65d engages the forward side of the lock member 67 as the rear side 65e of the catch member moves into engagement with the under side of the cam 70, as shown by the upper, second set of dotted lines in Figure 8.

The catch members 65 are thus capable of locking the propeller housing 59 relative to the support 62 or relative to the stirrup member 69.

Upon return movement of the wing from the dotted position shown in Figure 8 to the full line positions thereof shown in the same view, the extended ends 66a of the leaf springs engage the rear edge 62b of the support member 62, adjacent to the side margin of the saddle 62a, causing said lock members to release the catches so that when the bifurcated portions 65a, of each catch member, engages the corresponding pin 63, said pin causes the catch member to rotate clockwise, whereupon the lock member 67 engages the lug 65 and locks the propeller housing relative to the support until the wing is again shifted upwardly and the cam 70 again engages the catch member.

When in normal flight, the wing is in position shown by the solid lines in Figure 8, as the wing is in position the majority of the time, a cowling 72, may be secured to the support member 62 and extend rearwardly therefrom so as to enclose the above described mechanism. The cowling 72 and the supporting member 62, of course remain stationary when the wing is shifted about its axis.

The operation of the above is as follows:

In normal flight the wing and propellers are in the position indicated by solid lines in Figure 8. When desiring to change the angle of attack or the angle of incidence of the wing, said wing is rotated about the main shaft 53 while the propeller and housing remain fastened to the support 62. When the wing has rotated until its angle of attack relative to the thrust lines from the propeller corresponds to the angle of maximum lift of the wing, the stirrups 69 become locked to the propeller shaft housings. Further movement of the wing, shifts the propellers and their housings also so that the wing maintains a constant angle relative to the propellers' thrust lines.

The struts of each strut set are so arranged that strut members 7 and 10 thereof, point toward the forward and rear edges of the main body of the wing 2. These struts 7 and 10 are hollow for receiving cables 73. Anchors 74 and 75 are secured near the leading edge and near the rear end of the main portion of the wing 2 respectively. The cables 73 extend from their respective anchors through their corresponding spar members 7 and 10 respectively to the intersection thereof where they are connected to a pulley or any other suitable arrangement which in turn is linked with the control compartment of the airplane in any suitable manner not shown.

As shown in Figure 2, a plurality of propellers 61 are provided along the leading edge of the forward wing 2. The propellers are so arranged that practically the whole length of the wing is subjected to the wash therefrom. Thus the propellers are in a position for creating a slip stream around the wings 2 and 12, although the airplane may be standing still. Consequently a lifting force may be created before the airplane begins to take off.

When taking off, the wings 2 and 12 are shifted to the dotted line positions as shown in Figure 1 and the variable portions of the several wings are shifted to the dotted line position shown in Figure 12. In this position the wings are capable of their maximum lift. The direction of lift of the wing is rearwardly and upwardly. The direction of the thrust of the propeller is forwardly and upwardly so that the component between these two forces may be made approximately vertical or may be inclined forwardly, the desired amount so that the airplane may take off with little or no taxying.

When landing the wings are tilted to their maximum angle of attack and the camber is increased to maximum so that the stalling speed is greatly reduced thereby enabling the airplane to land with little or no taxying. Also when carrying heavy loads the camber and the angle of attack of the airplane wings may be increased so as to readily support the load. Likewise when traveling with a light load, the camber and angle of attack may be decreased so that the drag is decreased and the airplane is able to move more rapidly. Thus the lifting ability of the airplane may be varied according to the load it carries.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In an airplane, a fuselage, transversely extending main sustaining wings connected therewith and rotatable about a horizontal axis, propellers mounted along certain edges of said wings, means for shifting the thrust lines of said propellers with the rotation of said wings, control surfaces blower means, driving mechanism therefor, arranged to maintain a region of smooth air flow around said control surfaces regardless of the wash from said wings.

2. In an airplane, a fuselage, transversely extending main sustaining wings connected therewith and rotatable about a horizontal axis, propellers mounted along certain edges of said wings, means for shifting the thrust lines of said propellers with the rotation of said wings, the relationship of said propellers to said wings being such that the slip stream around said wings constitutes the wash from said propellers, control surfaces, blower means, driving mechanism therefor arranged to maintain a region of smooth air flow around said control surfaces regardless of the wash from said wings.

3. In an airplane, a fuselage, transversely extending wings connected therewith and rotatable about a horizontal axis, propellers mounted along certain edges of said wings, means for shifting the thrust lines of said propellers with the rotation of said wings, and camber changing means associated with said wings for increasing the lift thereof, and for maintaining the center of pressure thereof in a constant location when said wings are rotated about their axes.

4. In an airplane, a fuselage, transversely extending wings connected therewith and rotatable about a horizontal axis, propellers mounted along certain edges of said wings, means for shifting the thrust lines of said propellers with the rotation of said wings, the relationship of said propellers to said wings being such that the slip stream around said wings constitutes the wash from said propellers, and camber changing means associated with said wings for increasing the lift thereof and for maintaining the center of pressure thereof in a constant location when said wings are rotated about their axes.

5. In an airplane, a fuselage, transversely extending wings connected therewith and rotatable about a horizontal axis, propellers mounted along certain edges of said wings, means for shifting the thrust lines of said propellers with the rotation of said wings, control surfaces, blower means, driving mechanism therefor arranged to maintain a region of smooth air flow around said control surfaces regardless of the wash from said wings, and camber changing means associated with said wings for increasing the lift thereof and for maintaining the center of pressure thereof in a constant location when said wings are rotated about their axes.

6. In an airplane, a fuselage, transversely extending wings connected therewith and rotatable about a horizontal axis, propellers mounted along certain edges of said wings, means for shifting the thrust lines of said propellers with the rotation of said wings, the relationship of said propellers to said wings being such that the slip stream around said wings constitutes the wash from said propellers, control surfaces, blower means, driving mechanism therefor arranged to maintain a region of smooth air flow around said control surfaces regardless of the wash from said wings and camber changing means associated with said wings for increasing the lift thereof and for maintaining the center of pressure thereof in a constant location when said wings are rotated about their axes.

7. In an airplane, a fuselage, strut means extending therefrom, a wing supported upon said strut means and said fuselage, capable of limited rotation, means for controlling said rotation, power units mounted in said fuselage, main shafts driven by said power units extending along the axis of rotation of said wing, propeller shafts arranged in spaced apart relation to each other and transversely to said wing, said propeller shafts driven by said main shafts and extending to certain edges of said wing, propellers for said propeller shafts arranged to create a slip-stream over said wings indepedent of the airplane's movement, and means for securing said propeller shafts relative to said struts when said wing is in certain positions, said means also arranged to secure said propeller shafts to said wing when said wing is in certain other positions.

8. In an airplane, a fuselage, strut means extending therefrom, a wing supported upon said strut means and said fuselage, capable of limited rotation, means for controlling said rotation, power units mounted in said fuselage, main shafts driven by said power units extending along the axis of rotation of said wing, propeller shafts arranged in spaced apart relation to each other and transversely to said wing, said propeller shafts driven by said main shafts and extending to certain edges of said wing, propellers for said propeller shafts arranged to create a slip-stream over said wing independent of the airplane's movement, and means for creating bypass slots along certain portions of said wings and varying the camber of said wings.

9. In an airplane, a fuselage, strut means extending therefrom, a wing supported upon said strut means and said fuselage, capable of limited rotation, power units mounted in said fuselage, main shafts driven by said power units extending along the axis of rotation of said wing, propeller shafts arranged in spaced apart relation to each other and transversely to said wing, said propeller shafts driven by said main shafts and extending to certain edges of said wing, propellers for said propeller shafts arranged to create a slip-stream over said wing independent of the airplane's movement, and means for securing said propeller shafts relative to said struts when said wing is in certain positions, said means also arranged to secure said propeller shafts to said wing when said wing is in certain other positions, and means for creating bypass slots along certain portions of said wing and varying the camber of said wing.

10. In an airplane, a fuselage, strut means extending therefrom, a wing supported upon said strut means and said fuselage, capable of limited rotation, means for controlling said rotation, power units mounted in said fuselage, main shafts driven by said power units extending along the axis of rotation of said wing, propeller shafts arranged in spaced apart relation to each other and transversely to said wing, said propeller shafts driven by said main shafts and extending to certain edges of said wing, propellers for said propeller shafts arranged to create a slip-stream over said wing independent of the airplane's movement, and means for securing said propeller shafts relative to said struts when said wing is in certain positions, said means also arranged to secure said propeller shafts to said wing when said wing is in certain other positions, control surfaces for said airplane, and blower means for maintaining a region of smooth air flow around said control surfaces regardless of the air flow resulting from said propellers and said wings.

11. In an airplane, a fuselage, strut means extending therefrom, a wing supported upon said strut means and said fuselage, capable of limited rotation, means for controlling said rotation, power units mounted in said fuselage, main shafts driven by said power units extending along the axis of rotation of said wing, propeller shafts arranged in spaced apart relation to each other and transversally to said wing, said propeller shafts driven by said main shafts and extending to certain edges of said wing, propellers for said propeller shafts arranged to create a slip-stream over said wing independent of the airplane's movement, and means for securing said propeller shafts relative to said struts when said wing is in certain positions, said means also arranged to secure said propeller shafts to said wing when said wing is in certain other positions, and means for creating bypass slots along certain portions of said wing and varying the camber thereof, control surfaces for said airplane, and blower means for maintaining a region of smooth flow around said control surfaces regardless of the air flow resulting from said propellers and said wings.

In testimony whereof, I have hereunto set my hand at San Diego, California, this 30th day of July, 1929.

JOHN S. MAXWELL.